(12) United States Patent
Hommel et al.

(10) Patent No.: US 9,617,002 B2
(45) Date of Patent: Apr. 11, 2017

(54) SEAT FOR A VEHICLE AND VEHICLE

(71) Applicant: Lufthansa Systems Ag, Kelsterbach (DE)

(72) Inventors: Peter Hommel, Bad Homburg (DE); Jörg Liebe, Wiesbaden (DE)

(73) Assignee: Lufthansa Systems Ag, Kelsterbach (DE)

(*) Notice: Subject to any disclaimer, the term of this patent is extended or adjusted under 35 U.S.C. 154(b) by 0 days.

(21) Appl. No.: 14/410,218

(22) PCT Filed: Jun. 18, 2013

(86) PCT No.: PCT/EP2013/062646
§ 371 (c)(1),
(2) Date: Dec. 22, 2014

(87) PCT Pub. No.: WO2014/001155
PCT Pub. Date: Jan. 3, 2014

(65) Prior Publication Data
US 2015/0336673 A1    Nov. 26, 2015

(30) Foreign Application Priority Data
Jun. 25, 2012 (DE) .................. 10 2012 210 754

(51) Int. Cl.
*B64D 11/00* (2006.01)
*B64D 11/06* (2006.01)
*B60R 11/02* (2006.01)
*B60R 11/00* (2006.01)

(52) U.S. Cl.
CPC .... *B64D 11/00152* (2014.12); *B60R 11/0235* (2013.01); *B60R 11/0252* (2013.01); *B64D 11/0015* (2013.01); *B64D 11/06* (2013.01); *B64D 11/0624* (2014.12); *B60R 2011/0012* (2013.01); *Y02T 50/46* (2013.01)

(58) Field of Classification Search
CPC ..................... B64D 11/00152; B64D 11/06
See application file for complete search history.

(56) References Cited

U.S. PATENT DOCUMENTS 4,647,980 A * 3/1987 Steventon ............... H04N 5/64
                                              348/837
5,529,265 A * 6/1996 Sakurai ............. B64D 11/0015
                                              244/118.5
(Continued)

FOREIGN PATENT DOCUMENTS

GB      2422948          8/2006
WO    WO-2007024443 A2   3/2007

OTHER PUBLICATIONS

International Search Report and Written Opinion for PCT/EP2013/062646, 2013-2014 time frame (11 pages).*
(Continued)

*Primary Examiner* — Rodney Mintz
(74) *Attorney, Agent, or Firm* — Harris Beach PLLC

(57) ABSTRACT

The present invention relates to a seat for a vehicle, particularly an aircraft, having a visual playback device integrated in a surface of the seat. A base firmly connected to the seat is arranged in the surface of the seat. Said visual playback device is releasably attached to the base by means of a holder adapted to the visual playback device and the base.

15 Claims, 3 Drawing Sheets

(56) References Cited

U.S. PATENT DOCUMENTS

Figure 1:
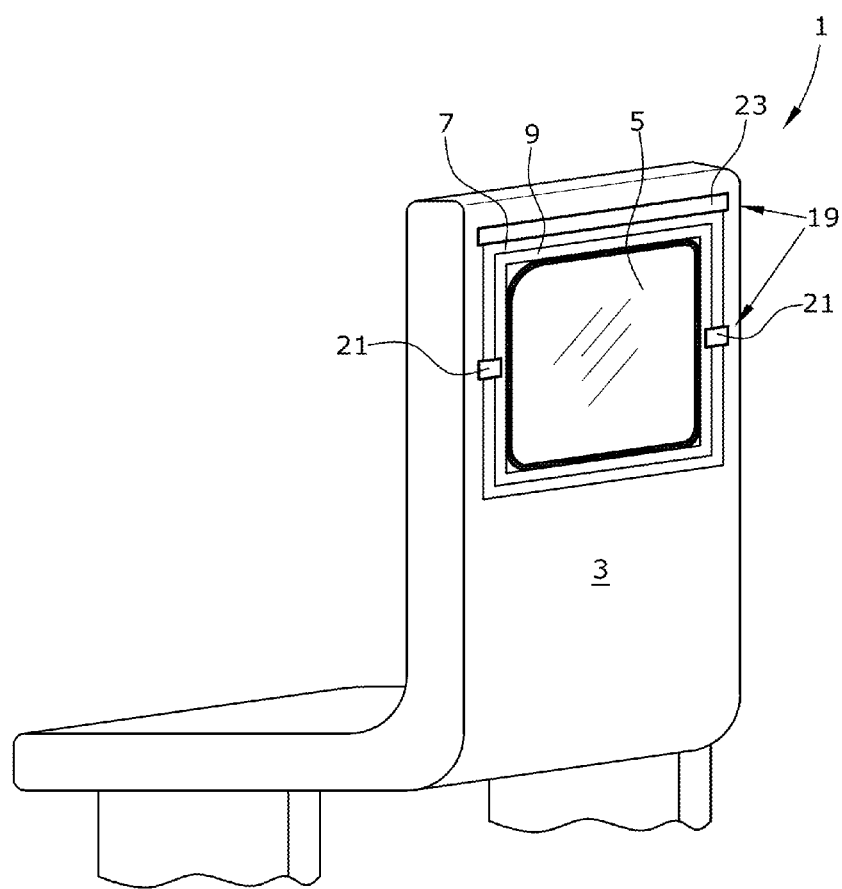

| | | | | |
|---|---|---|---|---|
| 5,640,297 | A * | 6/1997 | Labaze | B64D 11/0015 160/127 |
| 6,246,573 | B1 * | 6/2001 | Khan | G06F 1/16 312/223.2 |
| 6,370,037 | B1 * | 4/2002 | Schoenfish | H05K 5/0204 174/542 |
| 6,669,285 | B1 * | 12/2003 | Park | B60N 2/4876 297/217.3 |
| 6,883,870 | B2 * | 4/2005 | Jost | B60N 2/4808 297/217.3 |
| 6,905,167 | B2 * | 6/2005 | Jost | B60N 2/4876 297/188.04 |
| 6,986,190 | B2 * | 1/2006 | Jost | B60N 2/4876 29/469 |
| 7,080,866 | B2 * | 7/2006 | Reisinger | B60R 5/006 296/24.4 |
| 7,239,040 | B2 * | 7/2007 | Kitazawa | B60K 35/00 297/217.3 |
| 7,360,833 | B2 * | 4/2008 | Vitito | B60K 35/00 297/217.3 |
| 7,407,227 | B1 * | 8/2008 | Tuccinardi | B60R 11/0235 297/188.04 |
| 7,580,255 | B2 * | 8/2009 | Crooijmans | G06F 1/1632 361/679.41 |
| 7,597,393 | B1 * | 10/2009 | Tuccinardi | B60R 11/0211 297/188.04 |
| 7,643,283 | B2 * | 1/2010 | Jubelirer | G06F 1/1632 361/679.41 |
| 7,679,578 | B2 * | 3/2010 | Schedivy | B60N 2/4876 296/37.15 |
| 7,758,116 | B2 * | 7/2010 | Hattori | B60N 2/4808 297/217.3 |
| 7,909,397 | B2 * | 3/2011 | Shalam | B60R 11/0235 297/217.1 |
| 8,203,657 | B2 * | 6/2012 | Vitito | B60K 35/00 297/217.3 |
| 8,403,411 | B2 * | 3/2013 | Boyer, Jr. | B64D 11/0015 297/217.3 |
| 8,585,140 | B2 * | 11/2013 | Chang | B60R 11/0235 297/217.3 |
| 8,783,766 | B2 * | 7/2014 | Westerink | B64D 11/0015 297/217.3 |
| 8,955,728 | B2 * | 2/2015 | Schultze | B62J 9/008 224/413 |
| 9,004,588 | B2 * | 4/2015 | Chang | B60R 11/0235 297/217.3 |
| 9,120,408 | B2 * | 9/2015 | Wen | B60N 2/4876 |
| 2001/0008266 | A1 * | 7/2001 | Lambert | A47C 7/72 248/205.2 |
| 2003/0107248 | A1 * | 6/2003 | Sanford | B64D 11/06 297/217.3 |
| 2003/0137584 | A1 * | 7/2003 | Norvell | B60R 11/0235 348/61 |
| 2004/0004378 | A1 * | 1/2004 | Park | B60N 2/4876 297/217.3 |
| 2004/0032543 | A1 * | 2/2004 | Chang | B60R 11/0235 348/837 |
| 2004/0086259 | A1 * | 5/2004 | Schedivy | H04N 5/64 386/358 |
| 2004/0227861 | A1 * | 11/2004 | Schedivy | B60N 2/4876 348/837 |
| 2005/0052046 | A1 * | 3/2005 | Lavelle | B60N 2/4876 296/37.15 |
| 2005/0099548 | A1 * | 5/2005 | Vitito | B60N 2/4876 348/837 |
| 2005/0110913 | A1 * | 5/2005 | Vitito | B60R 11/0211 348/837 |
| 2005/0132407 | A1 | 6/2005 | Boyer et al. | |
| 2005/0166238 | A1 * | 7/2005 | Vitito | B60N 2/4876 725/77 |
| 2005/0184545 | A1 * | 8/2005 | Reisinger | B60R 5/006 296/24.4 |
| 2005/0204596 | A1 * | 9/2005 | Peng | G09F 21/04 40/320 |
| 2005/0206206 | A1 | 9/2005 | Peng | |
| 2006/0070103 | A1 * | 3/2006 | Vitito | B60K 35/00 725/77 |
| 2006/0119151 | A1 * | 6/2006 | Vitito | B60K 35/00 297/217.3 |
| 2006/0148577 | A1 * | 7/2006 | Vitito | B60K 35/00 463/46 |
| 2006/0181840 | A1 * | 8/2006 | Cvetko | B60R 11/02 361/679.55 |
| 2007/0047198 | A1 * | 3/2007 | Crooijmans | G06F 1/1632 361/679.41 |
| 2007/0052266 | A1 * | 3/2007 | Chu | B61D 33/005 297/217.3 |
| 2007/0057541 | A1 * | 3/2007 | Huang | B60R 11/0235 297/217.3 |
| 2007/0101372 | A1 * | 5/2007 | Chang | B60R 11/0235 725/75 |
| 2007/0222248 | A1 * | 9/2007 | Maulden | B60N 2/4876 296/37.15 |
| 2007/0290536 | A1 * | 12/2007 | Nathan | B60K 35/00 297/217.3 |
| 2008/0157574 | A1 * | 7/2008 | LaRussa | B60N 2/4876 297/217.3 |
| 2008/0170165 | A1 * | 7/2008 | Lee | B60R 11/0211 348/837 |
| 2008/0252798 | A1 * | 10/2008 | Vitito | B60K 35/00 348/837 |
| 2009/0085383 | A1 * | 4/2009 | Hicks | B60K 35/00 297/217.3 |
| 2010/0007805 | A1 | 1/2010 | Vitito | |
| 2010/0060050 | A1 * | 3/2010 | Muirhead | B64D 11/0015 297/217.4 |
| 2011/0181796 | A1 * | 7/2011 | Caltabiano | B60R 11/0235 348/837 |
| 2012/0248833 | A1 * | 10/2012 | Hontz | B60N 3/004 297/188.05 |
| 2012/0325878 | A1 * | 12/2012 | Schultze | B62J 9/008 224/413 |
| 2014/0284972 | A1 * | 9/2014 | Riedel | B64D 11/0015 297/188.04 |
| 2014/0284973 | A1 * | 9/2014 | Wolgast | B64D 11/0015 297/188.04 |
| 2015/0034687 | A1 * | 2/2015 | Terleski | B64D 11/0015 224/275 |
| 2015/0175265 | A1 * | 6/2015 | Thiele | B64D 11/00152 297/188.04 |
| 2015/0246645 | A1 * | 9/2015 | Procter | B60R 11/0235 297/135 |
| 2015/0367787 | A1 * | 12/2015 | Dueser | B60R 11/0235 297/188.05 |

OTHER PUBLICATIONS

Office action for related European Application No. 13730533.0 dated Jul. 13, 2016 including an English language translation (13 pages).*

* cited by examiner

SEAT FOR A VEHICLE AND VEHICLE

CROSS-REFERENCE TO RELATED APPLICATIONS

This application is a national stage application under 35 U.S.C. §371 of PCT Application No. PCT/EP2013/062646, filed Jun. 18, 2013, which claims priority to and the benefit of German Application No. 102012210754.1 filed on Jun. 25, 2012, which are incorporated herein by reference in their entirety.

The present invention relates to a seat for a vehicle, in particular an aircraft, with an integrated visual playback device, as well as to a vehicle with such a seat.

Often, vehicle seats, in particular the seats of means of transport such as airplanes, busses, trains or ships, have a display integrated in a surface of the seat, e.g. the rear wall of the seat, in order to entertain people sitting behind the same during travel.

The known displays integrated in seats, so-called in-seat screens, are most often specially made devices constructed and manufactured for the corresponding attachment. Thus, in-seat screens are no standardized displays.

Correspondingly, constructing and designing a set with an integrated display is a long-term and cost-intensive process. Often, it takes a year and more to construct a suitable display and a seat with a corresponding display. Further, the known in-seat screens are fixedly integrated in the seat so that replacing the display in case of a defect or in the course of modernization measures is very complicated.

Therefore, it is an object of the present invention to provide a vehicle seat having a visual playback device integrated in the seat, which seat has a simple structure and allows for a facilitated maintenance and replacement of the playback device.

The vehicle seat of the present invention, in particular for an aircraft, is described in detail hereinbelow.

The seat for a vehicle, in particular a means of transport such as an aircraft, comprises a visual playback device integrated in a surface of the seat, in particular the rear wall of the seat. A base is arranged in the surface of the seat, which base is fixedly connected with the seat. The visual playback device is detachably fastened to the base via a holder adapted to the visual playback device and the base. In the context of the invention, fixedly connected means that the base is integrated in the seat, so that the base can be removed from the seat only by complex disassembly measures, such as removing a part of the rear wall of the seat. In the context of the invention, removably fastened means that the holder can be detached from the base by simple means, such as, for example, manually actuating a locking device, by applying little force or by using a simple tool.

The seat of the present invention allows the use of commercially available, for example standardized visual playback devices that can be fastened to the base in a simple manner by means of the adapted holder, and can thereby integrated in the surface of the seat. Due to the holder being detachably fastened to the base, it is possible to remove the visual playback device from the seat in a simple manner. In the event of a defect of the visual playback device, the same can also be taken out of the base and be replaced in a simple manner. Thereby, the maintenance costs for the visual playback devices can be reduced significantly.

The invention also allows a facilitated modernization of the seat or the vehicle, by replacing the visual playback device with a modern one. Here, all that is required is an adaptation of the holder to a new visual playback device. The base fixedly connected with the seat can remain on the seat.

In addition, the seat of the present invention can be combined with different visual playback devices. When the seat of the present invention is used in a means of transport, such as an airplane, for example, the airline can provide the visual playback devices with the holder to mount these to the base of a seat. It is further also possible that a passenger fastens an own visual playback device to the base of a seat using a holder adapted to this device.

Since electronic devices fixedly installed in a means of transport, such as the known in-seat screens, are safety risks, they have to pass safety technical approval procedures, some of which are complex. Since, in the seat of the present invention, the visual playback device is removably fastened to the base, this may also result in simplified approval procedures.

Preferably, it is provided that the visual playback device is a tablet computer. The visual playback device can thus be part of an entertainment system, for example an entertainment network, of the vehicle. Besides a visual presentation of data, such as films, for example, the embodiment of the visual playback device as a tablet computer also allows an interaction of the user with the visual playback device, e.g. via a touchscreen. Moreover, tablet computers are commercially available in large numbers and are thus available at low cost so that an economic advantage exists over known in-seat screens fixedly integrated in the seats.

The detachable fastening of the playback device to the base and thus to the seat further enables the user to detach the visual playback device from the seat during use and to hold it in the hand, for example. This is particularly advantageous if tablet computers are used as a visual playback device, since operation and interaction are facilitated in this manner. Of course, sufficient power supply to the visual playback device must be ensured.

In a preferred embodiment of the invention it is provided that the base has an outer frame into which the holder with the visual playback device can be inserted. In this manner, the holder can be detachably fastened to the base in an advantageous manner. The base may form a recess in the surface of the seat, wherein the visual playback device with the holder is adapted to be inserted into the recess and preferably is flush with the surface of the seat. In this manner the visual playback device can be integrated in the seat in a manner requiring very little space, wherein the flush fit in the surface of the seat provides an optically appealing design.

The holder adapted to the base may have an inner frame into which the visual playback device can be inserted. Thereby, the playback device can advantageously be connected with the holder so that it is possible to fasten the playback device to the base in a simple manner. Here, it may be provided that the playback device is fixed in the inner frame. For example, it is possible to clip the visual playback device with the holder into the base.

In a preferred embodiment of the invention it is provided that the base is connected with a central power supply network, that a detachable power connection is provided between the base and the holder, and that the holder has a connector for the power connection of the visual playback device, wherein the visual playback device is adapted to be connected with the central power supply network via the base, the detachable power connection and the holder.

In this manner, the visual playback device can be supplied with the necessary electric power in an advantageous manner. In this regard, the system of the present invention makes it possible for the visual playback device to have an energy storage of its own, for example an accumulator, so that the same can be recharged via the central power supply network when the visual playback device is fastened to the base. As an alternative, it is also possible to use visual playback devices without an energy storage of their own, so that the visual playback device is only functional when fastened to the base. This may be advantageous, for example, when the seats of the present invention are used in airplanes, since batteries or accumulators may be unreliable and further tend to overheat. This may be a safety problem in particular when used in an airplane.

The connector provided in the holder for the power supply connection of the visual playback device may for instance be a standardized connector, such as a USB connector, for example, which is frequently used in tablet computers for power supply.

The detachable power connection between the base and the holder may be a quick contact connection such as a plug connection or a touch contact which may have spring contacts, for example.

In a particularly preferred embodiment of the invention it is provided that the power supply network is a low voltage DC power network. The power supply network can thus provide the voltage typically required for visual playback devices, such as tablet computers, for example, without requiring a complex intricate AC network. It is further possible to realize the DC network in a weight-saving manner, which is particularly advantageous when the seat of the present invention is used in an airplane.

The seat or the base may comprise a securing device for securing the holder to the base.

The securing device may be designed as a spring-actuated latch, for example. In this case, in order to release the holder from the base, the latch must be actuated to detach the holder and thus the visual playback device from the base. As an alternative or in addition, the securing device may comprise a shutter, preferably a rolling shutter or a sliding shutter, to cover the visual playback device and the holder. Via the shutter, the visual playback device and the holder can be secured to the base in an advantageous manner, so that, when the seat of the present invention is used in an airplane, for example, injuries can be prevented which, in the event of incidents, e.g. in case of an emergency landing, may be caused by loosened visual playback devices. By means of the shutter, it is further possible to cover the visual playback device entirely, so that in case of incidents injuries are avoided in which, for example, a passenger's head hits directly on the visual display device. Thus, the shutter serves as a kind of protective shutter. In this manner, the use of a seat including the visual playback device requires no separate approval, but merely the seat with the protective shutter has to pass the approval procedure.

The shutter may be configured as a rolling shutter, for example, which is pulled over the playback device from the top or from the side, for example. As an alternative, the shutter may also be configured as an attachment shutter that is fastened as a separate element. For example, the attachment shutter may be adapted to be fastened to the seat, the base and/or the holder. The attachment shutter may be fastened by plugging, clamping or also by means of separate securing means. It may also be provided that the folding table already present on a seat is used as a shutter to cover the visual playback device.

It may be provided that the visual playback device comprises a wireless data communication interface. In this manner, the visual playback device can advantageously be connected with an entertainment network installed in the vehicle. Of course, it is also possible that the visual playback device has a wired data communication interface that can be connected to a central data communication network. In this regard it is possible that the base is connected with the data communication network, that a detachable data communication connection is provided between the base and the holder, and that the holder has a connector for the data communication connection of the visual playback device. The connection of the visual playback device with the data communication network is thus realized in a manner similar to the connection of the visual playback device with the central power supply network. As an alternative, the data communication can also be effected via the power supply network.

The invention further provides a vehicle, in particular an airplane, with a plurality of seats according to the invention, the vehicle having an entertainment network that is in data communication with the visual playback devices.

It may be provided that each of a plurality of seats in the vehicle has a base of identical structure, wherein at least one visual playback device of one seat has a structure different from the visual playback devices of the other seats. The device differing from the other visual playback devices is fastened to one of the bases by means of a holder correspondingly adapted to this device, whereas the other visual playback devices have a different holder for fastening to one of the bases. Thereby, a vehicle can be adapted to different requirements. Owing to the possibility of using different playback devices, visual playback devices of different capacities can be employed in one vehicle, for example. Thus, in an airplane, for example, higher quality devices can be used in the first class or the business class that in the economy class, for instance, with all seats having the same base. In this manner, it is still possible to exchange the different devices.

The invention may further provide a safety system that detects whether a visual playback device is fastened to the base. This may be achieved, for instance, via the power supply network or the data communication network.

It is also possible that the safety device can be locked. This can be effected centrally, for example, so that, when a seat of the present invention is used in an airplane, detaching the visual playback device from the base is prevented in certain flight situations, e.g. take off and landing.

The safety system may also provide an electronic device, e.g. a chip, in the holder, through which it can be detected whether the virtual playback device is fastened to the base with the holder. As an alternative or in addition, the chip also allows the detection of an unauthorized removal of the visual playback device from the vehicle.

Figure 2:
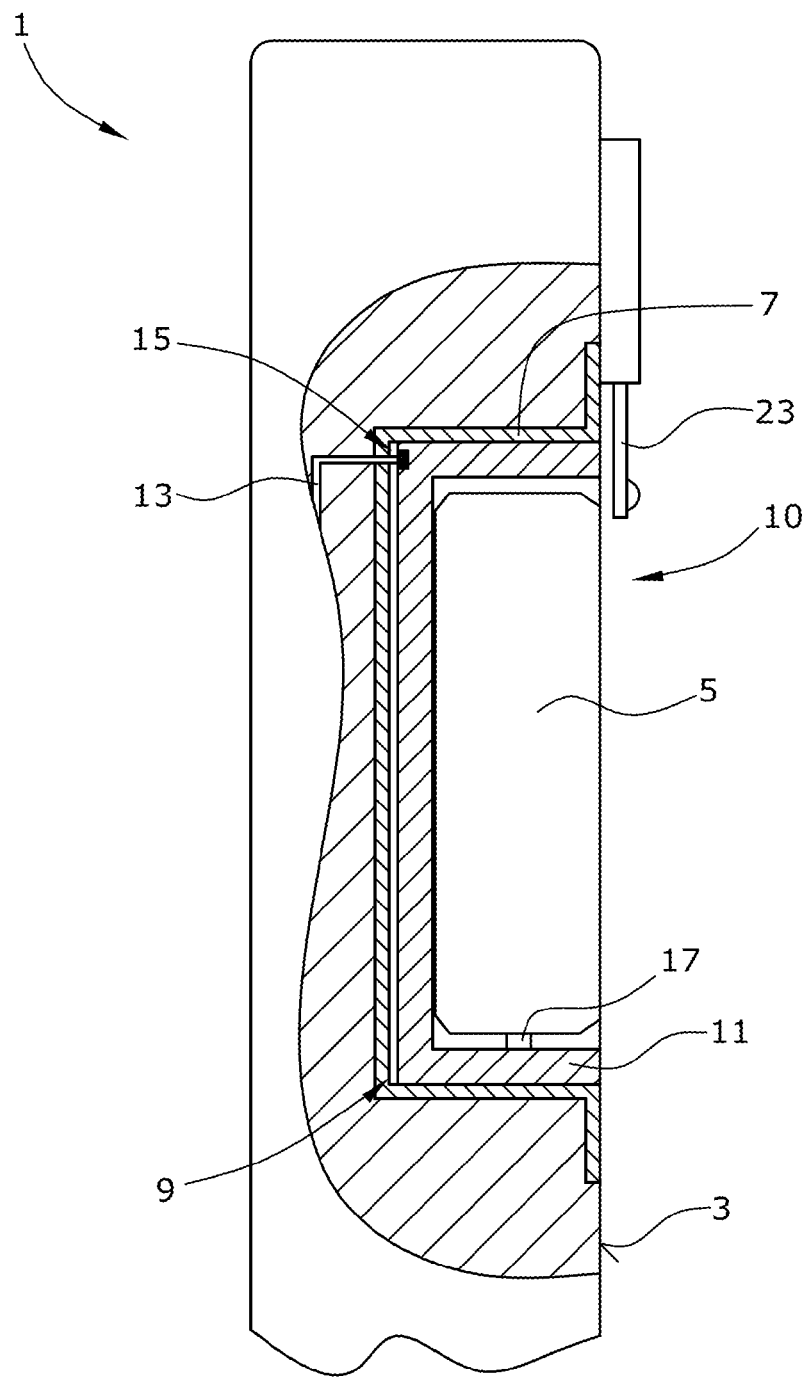
Figure 3:
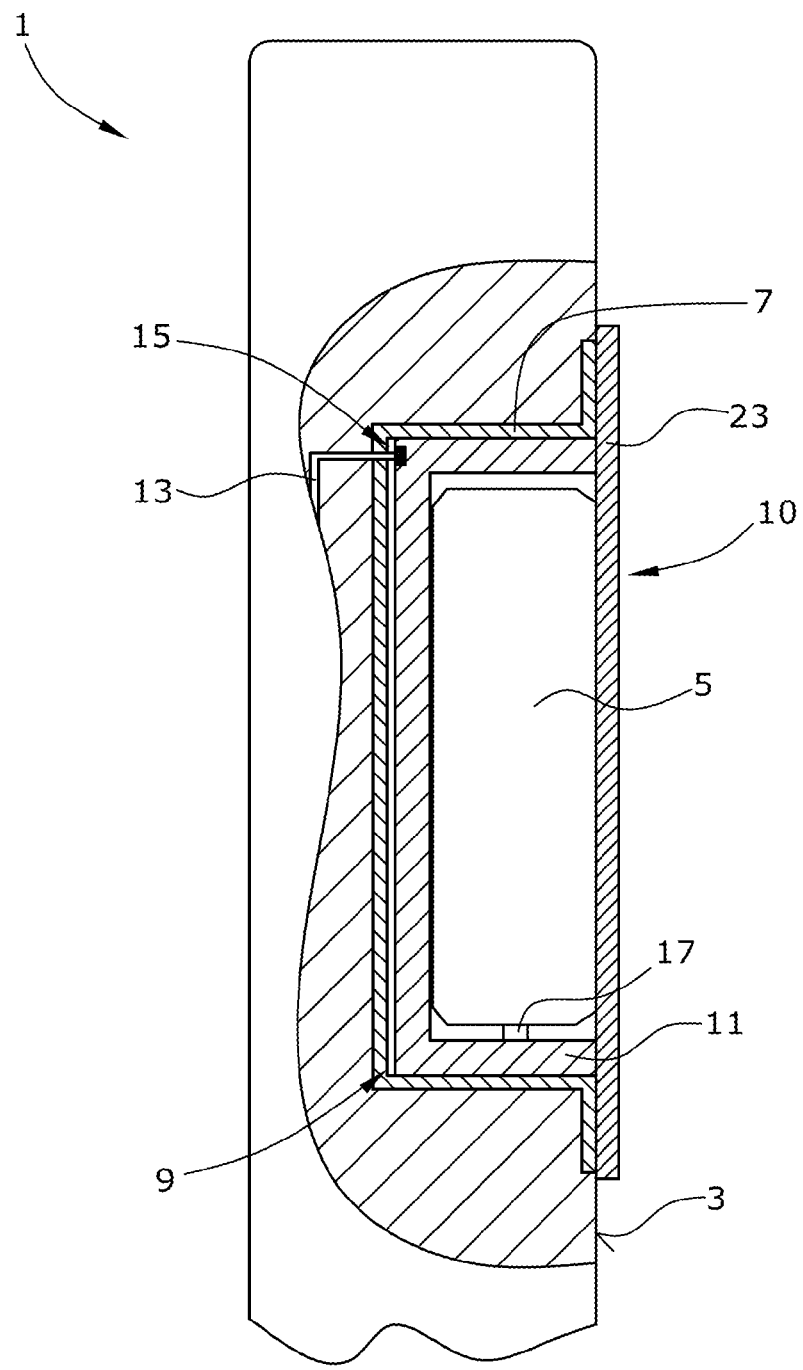

The following is a detailed explanation of the invention with reference to the accompanying Figures. In the Figures:

FIG. 1 a schematic illustration of a seat of the present invention in perspective view, FIG. 2 a schematic sectional view of the backrest of a first embodiment of a seat of the present invention, and FIG. 3 a schematic sectional view of the backrest of a second embodiment of a seat of the present invention.

The Figures schematically illustrate two embodiments of seats 1 for a vehicle, in particular an aircraft, according to the invention.

A visual playback device 5 is integrated in a surface 3 of the seat 1. In the embodiments illustrated in the Figures, the surface 3 of the seat 1 is the rear wall of the seat, so that the integrated visual playback device 5 can be used by a person situated behind the seat 1.

A base 7 fixedly connected with the seat 1 is arranged in the surface 3 of the seat 1. In the embodiment illustrated in the Figures, the base 7 is formed with an outer frame that forms a recess 10 in the surface 3 of the seat 1. For example, the base 7 may be screwed, riveted or glued to the seat 1.

The visual playback device 5, which may be a tablet computer, for example, is releasably fastened to the base 7 by means of a holder 9 adapted to the visual playback device 5. The holder 9 is also adapted to the base 7. The holder 9 has an inner frame 11 into which the visual playback device 5 can be inserted. The visual playback device 5 is fixed in the inner frame 11, e.g. by means of a clamping connection, by clipping or in another force or form fitting manner.

By virtue of the holder 9, the visual playback device 5 can be inserted into the recess 10 of the base 7 such that the visual playback device 5 fits flush with the surface 3 of the seat.

The base 7 is connected with a power supply network, not illustrated herein, through a power line 13 integrated in the seat 3, wherein a detachable power connection 15, e.g. a quick contact connection such as a touch contact, for instance, is arranged between the base 7 and the holder 9. The holder 9 further comprises a connector 17 for the power supply connection of the visual playback device 5. The visual playback device 5 may thus be connected with the central power supply network via the base 7, the detachable power connection 15 and the holder 9. Through a comparably designed electric connection or through a separate similarly designed connection, the visual playback device 5 may also be connected with a data communication network. In addition or as an alternative, it is possible that the visual playback device 5 comprises a wireless interface, e.g. according to the WLAN standard, via which a link to a wireless data communication network is possible.

The power supply network may, for example, be a low voltage power network between 5 and 12 V. Such voltages are typically sufficient for tablet computers so that such a power supply network is sufficient for the power supply of the visual playback device 5.

The seat 1 further comprises a securing device 19 for securing the holder 9 on the base 7 and thus for securing the visual playback device 5. The securing device 19 may have spring latches 21, for example, that retain the holder 9 in the base 7. In addition or as an alternative, the securing device 19 may comprise a shutter 23 with which the visual playback device 5 and the holder 9 can be covered and thus be shielded.

In the embodiment of the seat illustrated in FIG. 2, the shutter 23 is designed as a rolling shutter which, as illustrated in FIG. 2, can be pulled over the visual playback device 5 from the top. Of course, it is also possible that the shutter is arranged laterally of the playback device 5 so that the same can be pulled over the visual playback device 5 from the side.

In an alternative embodiment of the present invention schematically shown in FIG. 3, the securing device 19 comprises a shutter 23 in the form of an attachment shutter. The attachment shutter is a separate element and is fastened to the seat 1, covering the visual playback device 5. Here, the attachment shutter can be fastened to the surface 3 of the seat 1, the holder 9 and/or the base 7. For example, the attachment shutter can be fastened by clamping, form-fitting, separate securing means or also magnetically. In an embodiment not illustrated it is provided that a folding table arranged on the surface 3 of the seat 1 serves as the shutter 23.

The shutter 23 further offers the advantage that the cabin crew can determine in a simple manner, whether the visual playback device 5 is correctly secured before takeoff or landing. This can be achieved, for instance, by checking, whether a shutter 23 is fully closed.

The visual playback device 5 may have an own energy storage, e.g. a battery or an accumulator, or it may also be designed without an energy storage so that it is functional only when the detachable power connection 15 is closed.

The visual playback device 5 can be part of an entertainment network with which it is in data communication. Via the visual playback device 5, it is possible, for example, to present film or image data, such as videos, for instance, or the visual playback device 5 allows a user access to the Internet. Due to the detachable connection between the holder 9 and the base 7, the visual playback device 5 can be detached from the seat 1 in a simple manner so that, for example, a user can use the visual playback device 5 while holding it in his hand or placing it on his lap, provided that a corresponding power supply is established. Further, the detachable fastening of the holder 9 on the base 7 allows the visual playback device 5 to be removed from the seat 1 in a simple manner for maintenance or replacement. Maintenance work is thus substantially facilitated and can be performed at lower cost. Moreover, the seat 1 of the present invention can be modernized in a simple manner by replacing an outdated visual playback device 5 with a new, modern visual playback device 5. When the seat 1 of the present invention is used with a new visual playback device 5, all that is required is a new structure for the holder 9 since the same has to be adapted to the new visual playback device 5. The base 7 can remain in the seat 1 so that the design and retrofitting effort is kept very low during the modernization of a seat 1 of the invention.

When the seat 1 of the present invention is used in a means of transport, such as an airplane, for instance, it is possible that the visual playback devices 5 and the holders 9 are kept in store centrally and can be handed out to the passengers on request. Further, it is possible that a passenger uses his own tablet computer in the seat 1 of the present invention, in which case the passenger or the airline has to provide for a holder 9 adapted to the corresponding device.

The invention claimed is:

1. A seat for an aircraft having:
   a visual playback device integrated in a surface of the seat, wherein a base firmly connected to the seat is arranged in the surface of the seat, said visual playback device being releasably attached to the base by means of a holder adapted to the visual playback device and the base and wherein the visual playback device is removable from the base via the holder and together with the holder, which is detachably fastened to the base, and further having a securing device for securing the holder to the base, wherein the securing device has a shutter for covering the visual playback device and the holder.

2. A seat for an aircraft having:
   a visual playback device integrated in a surface of the seat, wherein a base firmly connected to the seat is arranged in the surface of the seat, said visual playback device being releasably attached to the base by means of a holder adapted to the visual playback device and the base and wherein the visual playback device is removable from the base via the holder and together with the holder, which is detachably fastened to the base, and further having a securing device for securing the holder to the base, wherein the securing device has an injury prevention shutter for covering the visual playback device and the holder to prevent personal injury.

3. A seat for a vehicle having:
a visual playback device integrated in a surface of the seat, wherein a base firmly connected to the seat is arranged in the surface of the seat, said visual playback device being releasably attached to the base by means of a holder adapted to the visual playback device and the base and wherein the visual playback device is removable from the base via the holder and together with the holder, which is detachably fastened to the base, and further having a securing device for securing the holder to the base, wherein the securing device has a shutter for covering the visual playback device and the holder.

4. The seat of claim 3, wherein the visual playback device is a tablet computer.

5. The seat of claim 3, wherein the base comprises an outer frame into which the holder with the visual playback device is inserted.

6. The seat of claim 3, wherein the base forms a recess in the surface of the seat, the visual playback device being adapted to be inserted into the recess together with the holder and fitting flush with the surface of the seat.

7. The seat of claim 3, wherein the shutter is configured as a rolling shutter or an attachment shutter.

8. The seat of claim 3, wherein the visual playback device has a wireless data communication interface.

9. The seat of claim 3, wherein the holder has an inner frame into which the visual playback device is inserted.

10. The seat of claim 9, wherein the visual playback device is fixed in the inner frame.

11. The seat of claim 3, wherein the base is connected with a central power supply network, that a detachable power connection is arranged between the base and the holder, and that the holder has a connector for connection of the visual playback device to the power supply, the visual playback device being connectable with the central power supply network via the base, the detachable power connection and the holder.

12. The seat of claim 11, wherein the detachable power connection is a quick contact connection.

13. The seat of claim 11, wherein the power supply network is a low voltage DC power network.

14. A vehicle having:
a plurality of said seats of claim 3; and
wherein an entertainment network is in data communication with each said visual playback device.

15. The vehicle of claim 14, wherein each said seat of the plurality of seats comprises the base of identical structure, while at least one said visual playback device of one said seat has a structure different from that of the visual playback devices of other said seats.

* * * * *